United States Patent
Hiti et al.

(10) Patent No.: US 7,944,161 B2
(45) Date of Patent: May 17, 2011

(54) DC BUS DISCHARGE IN AN ELECTRIC MOTOR SYSTEM

(75) Inventors: Silva Hiti, Redondo Beach, CA (US); David Tang, Fontana, CA (US); Brian A. Welchko, Torrance, CA (US); Milun Perisic, Torrance, CA (US); Constantin C. Stancu, Anaheim, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 514 days.

(21) Appl. No.: 12/047,123

(22) Filed: Mar. 12, 2008

(65) Prior Publication Data
US 2009/0230913 A1 Sep. 17, 2009

(51) Int. Cl.
*H02P 21/00* (2006.01)
(52) U.S. Cl. .................................. 318/400.02
(58) Field of Classification Search .......... 318/139, 318/400.02, 400.3, 727
See application file for complete search history.

(56) References Cited

U.S. PATENT DOCUMENTS

| | | | | |
|---|---|---|---|---|
| 5,852,558 A * | 12/1998 | Julian et al. | | 363/132 |
| 5,905,644 A * | 5/1999 | Blasko et al. | | 363/41 |
| 5,909,094 A * | 6/1999 | Yamada et al. | | 318/140 |
| 6,198,240 B1 * | 3/2001 | Notohara et al. | | 318/268 |
| 6,577,483 B1 * | 6/2003 | Steicher et al. | | 361/90 |
| 6,768,284 B2 * | 7/2004 | Lee et al. | | 318/808 |
| 7,135,833 B2 * | 11/2006 | DeLange et al. | | 318/762 |

* cited by examiner

*Primary Examiner* — Rina I Duda
(74) *Attorney, Agent, or Firm* — Ingrassia Fisher & Lorenz, P.C.

(57) ABSTRACT

Methods and apparatus are provided for improved discharge of a DC bus which provides power to an inverter. An electric motor system provided with the improved discharge method for discharge of the DC bus includes an electric motor, the inverter which provides electric control for the permanent magnet electric motor, the direct current (DC) bus which provides power to the inverter, and a processor. The processor generates operational control signals and provides such operational control signals to the inverter. In response to detecting a predetermined discharge signal, the processor generates operational control signals for generating a ripple current in motor windings of the electric motor to dissipate energy from the DC bus through a passive load, the passive load including the motor windings of the electric motor.

20 Claims, 4 Drawing Sheets

DC BUS DISCHARGE IN AN ELECTRIC MOTOR SYSTEM

TECHNICAL FIELD

The present invention generally relates to electric motor systems, and more particularly relates to methods and apparati for discharge of the direct current (DC) bus in electric motor systems.

BACKGROUND OF THE INVENTION

Electric motor systems typically include motor control circuits, such as inverters. Power is supplied to the motor control circuits by a direct current (DC) bus having a DC bus capacitor coupled between the high and low voltage nodes of the DC bus. When the DC bus is powered down, the energy stored in the DC bus capacitor is typically discharged by connecting the DC bus to a dedicated discharge circuit which typically includes a large resistor or other dissipative device employed for discharging the DC bus capacitor. Conventional dedicated discharge circuits, which are actively connected to the DC bus only when the discharge function is desired, to reduce system power losses (i.e., those system power losses which would result from continuous connection of the dissipative device to the DC bus), add both size and cost to the motor control circuitry.

Accordingly, it is desirable to provide a DC bus discharge scheme which employs existing circuitry to perform the necessary discharge functions. In addition, it is desirable to provide a reliable DC bus discharge scheme which does not require extraneous information. Furthermore, other desirable features and characteristics of the present invention will become apparent from the subsequent detailed description and the appended claims, taken in conjunction with the accompanying drawings and the foregoing technical field and background.

SUMMARY OF THE INVENTION

An electric motor system is provided with improved discharge of a DC bus which provides power to an inverter. The electric motor system includes an electric motor, the inverter which provides electric control for the electric motor, the direct current (DC) bus which provides power to the inverter, and a processor. The processor generates operational control signals and provides such operational control signals to the inverter. In response to detecting a predetermined discharge signal, the processor generates operational control signals for generating a ripple current in motor windings of the electric motor to dissipate energy from the DC bus through a passive load, the passive load including the motor windings of the electric motor.

A method is provided for discharging a direct current (DC) bus providing power to a motor control circuit in an electric motor system. The method includes the steps of detecting a predetermined discharge signal and generating operational control signals for generating a ripple current in motor windings of an electric motor of the electric motor system to dissipate energy from the DC bus through a passive load in response to detecting the predetermined discharge signal, where the passive load includes the motor windings of the electric motor. The method further includes the step of providing the operational control signals to the motor control circuit for discharging the DC bus through the motor control circuit and the motor windings of the electric motor.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
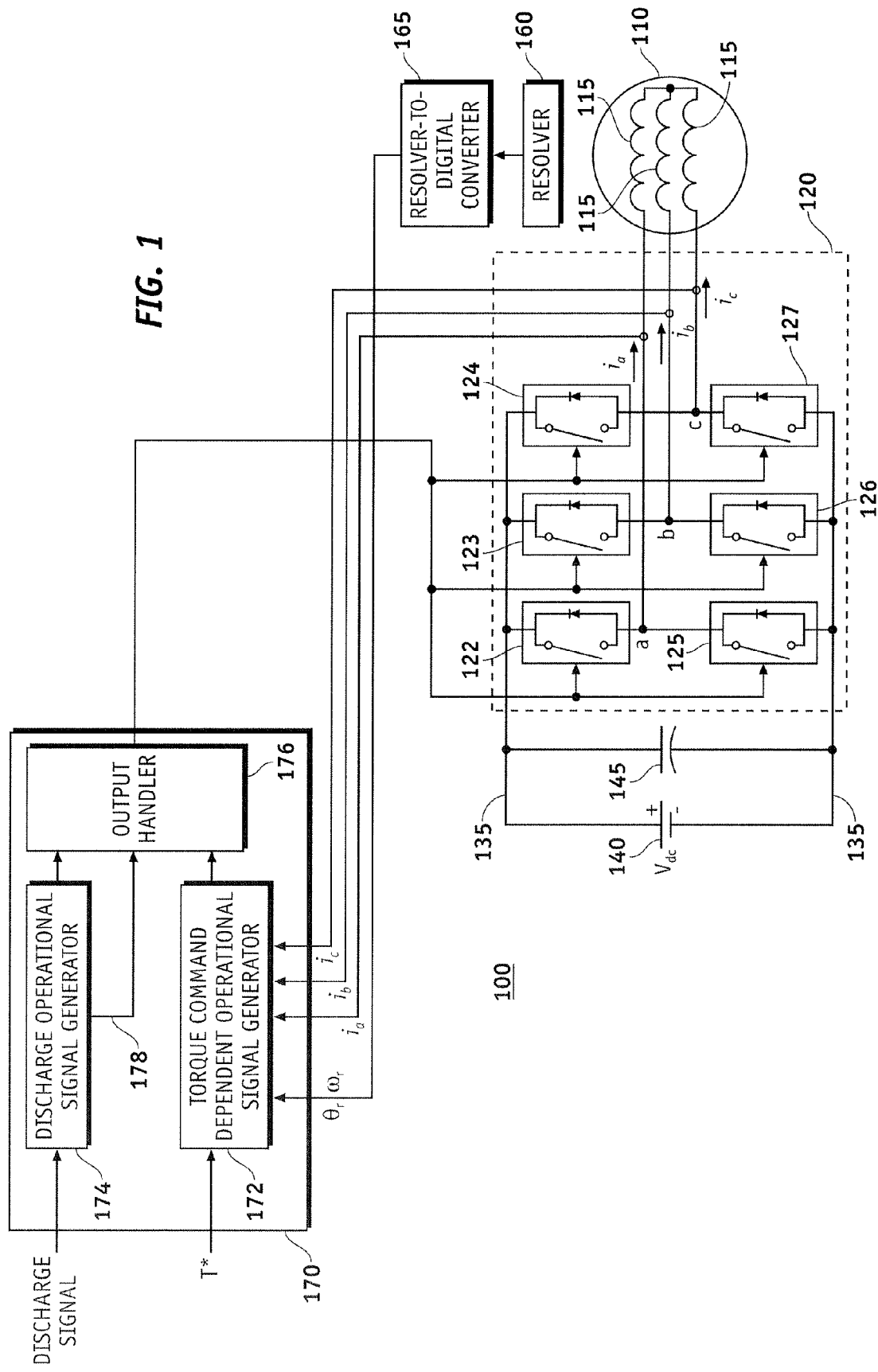
FIG. 1 illustrates a block diagram of an electric motor system in accordance with an embodiment of the present invention.

Referring to FIG. 1, an electric motor system 100 in accordance with an embodiment of the present invention includes a three-phase electric motor 110, such an induction machine or a permanent magnet electric motor, which operates in response to signals from a motor control circuit 120, such as an inverter. The inverter 120 providing electric control for the electric motor 110 is connected between direct current (DC) bus lines 135 of a power source 140. The inverter 120 includes switches 122 to 127 and operates in response to operational control signals from a processor 170 to provide voltage to each phase or motor winding 115 of the motor 110, each of the switch pairs 122/125, 123/126 and 124/127 forming a phase leg of the inverter 120. In addition to the switch circuitry depicted in the inverter 120, the switches 122 to 127 could alternatively be implemented by transistors, such as Insulated Gate Bipolar Transistors (IGBTs).

A DC bus capacitor 145 is connected between the DC bus lines 135 for protection of the inverter 120 and the power source 140. A resolver 160 (or similar sensing device or virtual software equivalent) is coupled to the motor 110 for measuring the rotor position and detecting the speed thereof. A resolver-to-digital converter 165 converts the signals from the resolver 160 to digital signals and provides those digital representations of angular position and detected speed of the rotor of the motor 110 to the processor 170.

The processor 170 includes a torque dependent operational signal generator 172 which receives the digital representations of angular position and detected rotor speed as well as current signals ($I_a$, $I_b$, $I_c$) from each phase 115 of the motor 110. The torque command dependent operational signal generator 172 modifies the phase currents ($I_a$, $I_b$, $I_c$) in response to a torque control signal (torque command T*) to generate operational control signals for provision to the inverter 120, the torque control signal received from a higher level controller. The operational control signals are high frequency pulse width modulation (PWM) signals used to control the per-cycle average, output voltage magnitude, phase, and frequency of the inverter 120. Typically, the switches 122, 123, 124, 125, 126, 127 of the inverter 120 operate at a constant switching frequency while the switch duty cycles are modulated to produce three phase voltages of desired magnitudes, phase, and frequency to provide to the phases 115 of the motor 110.

The processor 170, in accordance with the present embodiment, also includes a discharge operational signal generator 174 for discharging the DC bus capacitor 145 when the DC bus 135 is powered down through a passive load, the passive load including the motor windings 115 of the motor 110 and energy losses of the inverter 120. In response to receiving a predetermined discharge signal from a higher level controller, the discharge operational signal generator 174 generates passive load discharging operational control signals to generate a ripple current in the motor windings 115 to dissipate the energy from the DC bus 135 through the passive load in response to detecting the predetermined discharge signal. The passive load discharging operational control signals provide from the discharge operational signal generator 174 to an output handler 176.

The torque command dependent operational signal generator 172 also provides operational control signals to the output handler 176. The output handler typically provides the operational control signals from the torque command dependent operational signal generator 172 to an output of the processor 170. In response to receiving the predetermined discharge signal, the discharge operational signal generator 174 provides a signal on line 178 to the output handler 176 to inhibit the operational control signals from the torque command dependent operational signal generator 172 and, instead, to provide the passive load discharging operational control signals from the discharge operational signal generator 174 to the output of the processor 170.

Controlling the phase currents of the electric motor 110 to a regulated amplitude by the passive load discharging operational control signals generated by the discharge operational signal generators 174, energy from the DC bus 135 is dissipated in the motor windings 115 of the electric motor 110 and inverter losses of the motor control circuit 120. Since the purpose of the regulated phase currents in the motor windings 115 (i.e., the phase currents regulated by the discharge operational control signals) is to discharge the DC bus 135, the electric motor 110 is controlled as if it were a passive load such that no torque is developed therein. In this manner, existing circuitry (i.e., the processor 170) is employed to perform the discharge of the DC bus 135, including the DC bus capacitor 145.

Figure 2:
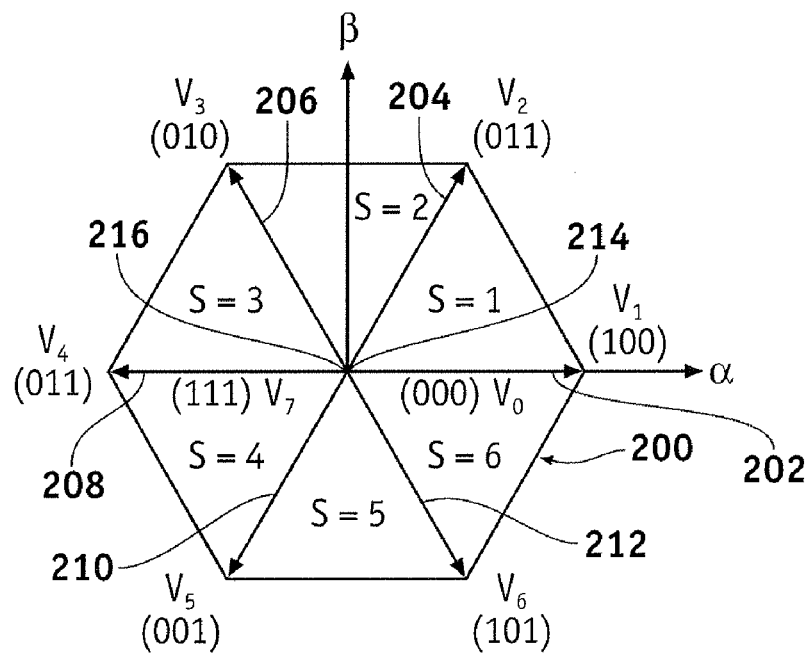
FIG. 2 illustrates the active switching vector space for an electric motor of the electric motor system of FIG. 1 in accordance with the embodiment of the present invention.

Referring to FIG. 2, an active switching vector space for the electric motor 110 in accordance with the present embodiment is represented as a hexagon 200 where any reference output voltage vector falling inside the hexagon 200 boundaries can be produced, on a per cycle average basis, by a combination of switching space vectors. Eight switching state vectors 202, 204, 206, 208, 210, 212, 214 and 216 represent the eight possible combinations of the states of the inverter switches 122, 123, 124, 125, 126, 127 where the three phase-to-neutral voltages sum to zero. The switching state vectors 202, 204, 206, 208, 210 and 212 are active states as indicated by the vertices of the hexagon 200, and the switching states 214 and 216 are zero states. During an active state, a net voltage is applied to the motor 110; during a zero state, the motor 110 is effectively shorted. Adjusting the duty ratios of the active and zero states can apply the desired output voltage to the load.

In accordance with the present embodiment, when the predetermined discharge signal is detected, the discharge operational signal generator 174 employs a ripple current based discharge method for discharging the DC bus 135. The discharge operational signal generator 174 introduces a ripple current into the inverter 120 to discharge the DC bus 135 through the motor windings 115 of the motor 110 by manipulation of voltage vector pairs 202/208, 204/210, 206/212, 214/216.

By generating the discharge operational control signals in response to the vector pairs 202/208, 204/210, 206/212, 214/216, the discharge operational signal generator 174 advantageously introduces a ripple current into the inverter 120 for discharging the DC bus 135 without requiring any information regarding the rotor position of the load of the motor 110 (i.e., without requiring the sensed currents $I_a$, $I_b$, $I_c$ or any information (e.g. $\theta_r$ or $\omega_r$) from the signal from the resolver-to-digital converter 165).

Figure 3:
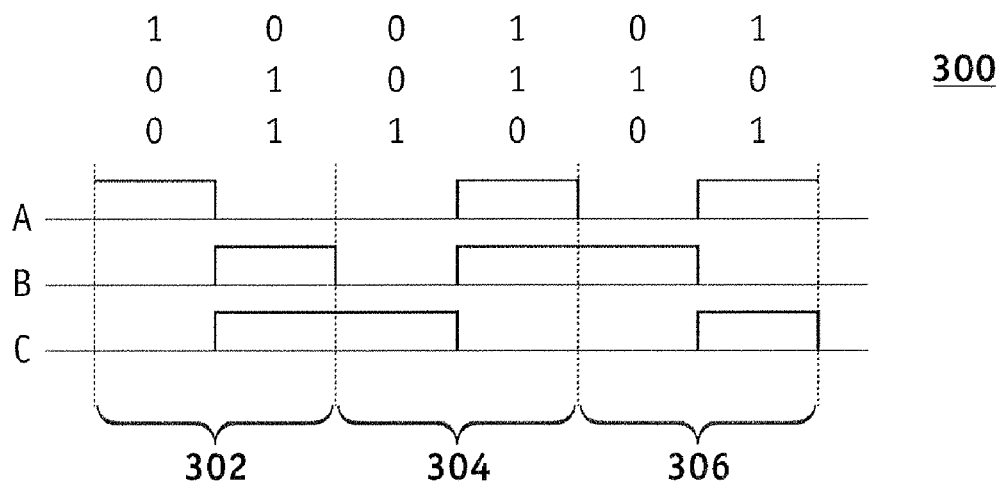
FIG. 3 illustrates a switching vector scheme for the discharge operational signal generator of the electric motor system of FIG. 1 in accordance with the embodiment of the present invention.

FIG. 3 illustrates a switching vector scheme 300 for the generation of the discharge operational control signals by the discharge operational signal generator 174 in accordance with the present embodiment. As stated above, adjusting the duty ratios of the active and zero states can apply a desired output voltage to the passive load (i.e., the motor 110). Appropriate switching sequences will create zero vectors from combinations of active switching vectors. For example, a sequence which uses vector V1 202 and vector V4 208 with identical duty cycles will create zero average voltage over a switching cycle while creating a ripple current in the motor 110 because the applied voltage to the motor 110 is not zero on an instantaneous basis. For permanent magnet motors 110, introducing a ripple current by generating discharge operational control signals having a predetermined switching sequence and a predetermined duty cycle in accordance with the present embodiment works well at zero speed and low speeds; for induction motors 110 introducing the ripple current by generating such discharge operational control signals works throughout the speed range for the induction motors 110.

The switching vector scheme 300 is an exemplary scheme which employs switching sequences 302, 304, 306 to create zero vectors from combinations 202/208, 210/204, 206/212 of active switching vectors $V_1$ 202, $V_2$ 204, $V_3$ 206, $V_4$ 208, $V_5$ 210, $V_6$ 212 to induce a ripple current in the motor 110. No average torque is produced by the motor 110 when the switching vector scheme 300 is used to generate the discharge operational control signals. The non-torque producing ripple current in the motor 110 creates system losses in the motor windings 115 and the inverter 120 which enable the discharging of the DC bus capacitor 145 without requiring resistive elements.

Thus, the switching vector scheme 300 has a predetermined duty cycle which includes the predetermined switching sequences 302, 304, 306. The six active switching vectors $V_1$ 202, $V_2$ 204, $V_3$ 206, $V_4$ 208, $V_5$ 210, $V_6$ 212 are divided into three vector pairs of two active switching vectors each 202/208, 210/204, 206/212, where the two active switching vectors of each of the three vector pairs adds up to zero in each of the predetermined switching sequences 302, 304, 306. The switching sequences 302, 304, and 306 may be applied in any order or combination thereof.

The magnitude of the ripple current generated by the switching vector scheme 300 depends on the frequency of the duty cycle 302, 304, 306, as well as on the voltage of the DC bus 135 and the inductance of the electric motor 110 at the ripple frequency. The inductance of the electric motor 110 is typically sufficiently small at higher frequency, so an excitation frequency (i.e., a predetermined duty cycle frequency) of between ten and twelve kilohertz (10 kHz and 12 kHz) can be used.

Figure 4:
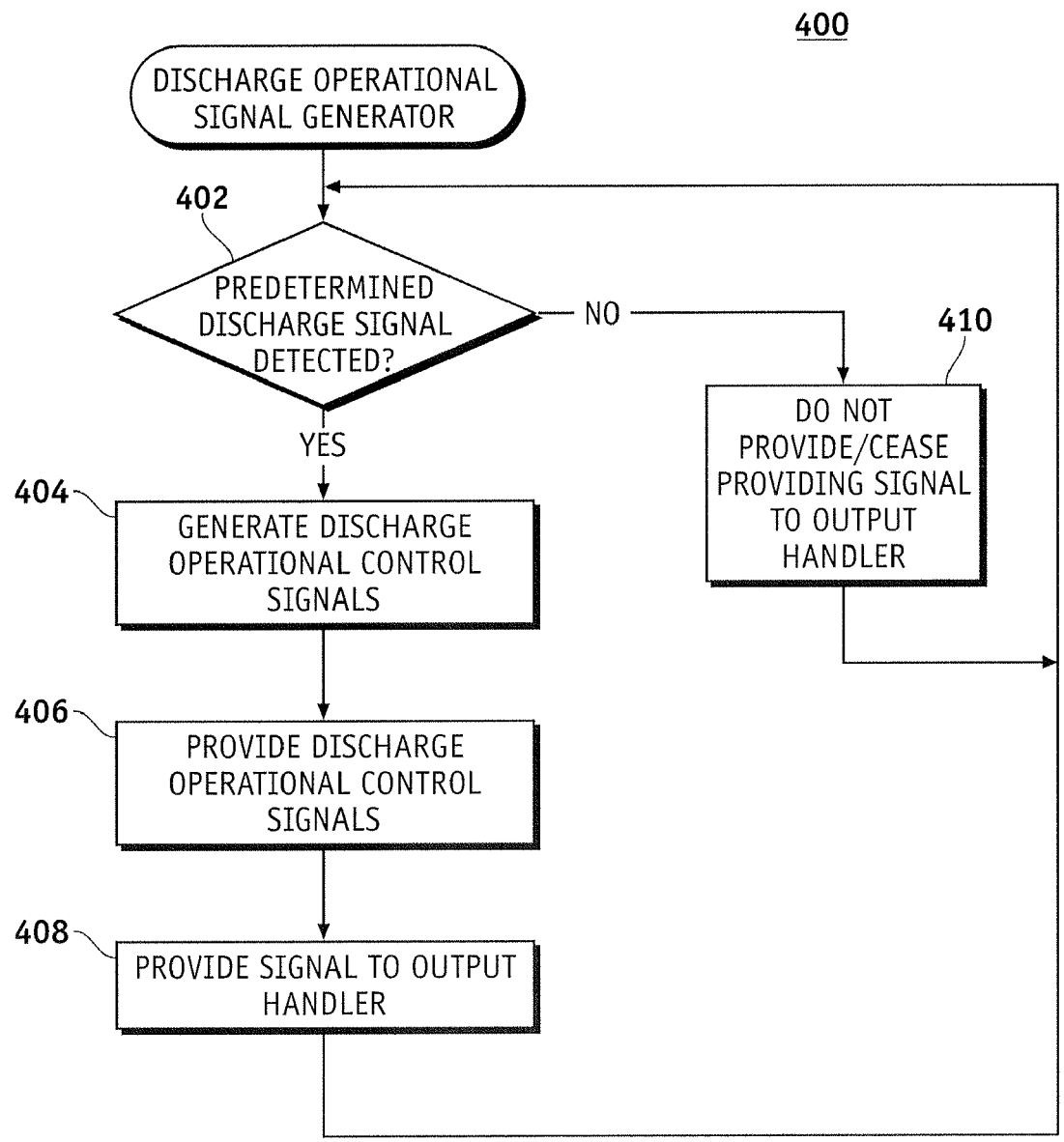
FIG. 4 illustrates a flowchart of the operation of the discharge operational signal generator of the electric motor system of FIG. 1 in accordance with the embodiment of the present invention.

Referring to FIG. 4, a flowchart 400 of the operation of the discharge operational signal generator 174 of the electric motor system 100 in accordance with the embodiment of the present invention is depicted. When the predetermined discharge signal from the higher level controller is detected 402, discharge operational signals are generated 404 in response to the vector pairs 202/208, 204/210, 206/212, 214/216 to introduce the ripple current into the motor windings 115 as discussed above. Thus, the ripple current is employed by the discharge operational signal generator 174 to actively discharge the DC bus 135 during a shutdown sequence initiated by the higher level controller providing the predetermined discharge signal to the discharge operational signal generator 174.

The discharge operational signals are provided 406 to the output handler 176 along with a signal 408 on line 178 to signal the output handler 176 to inhibit the flow of the operational control signals from the torque command dependent operational signal generator 172 and, instead, to provide the discharge operational signals from the discharge operational signal generator 174 to the output of the processor 170. Provision of the discharge operational signals from the output of the processor 170 continues under the control of the signal provided to the output handler at step 408 until the discharge operational signal generator 174 no longer detects 402 the predetermined discharge signal. When the predetermined discharge signal is not detected 402, the discharge operational signal generator 174 ceases 410 providing the signal to the output handler on line 178, thereby allowing the processor 170 to provide operation control signals from the torque command dependent operational signal generator 172 at the output of the processor 170.

Figure 5:
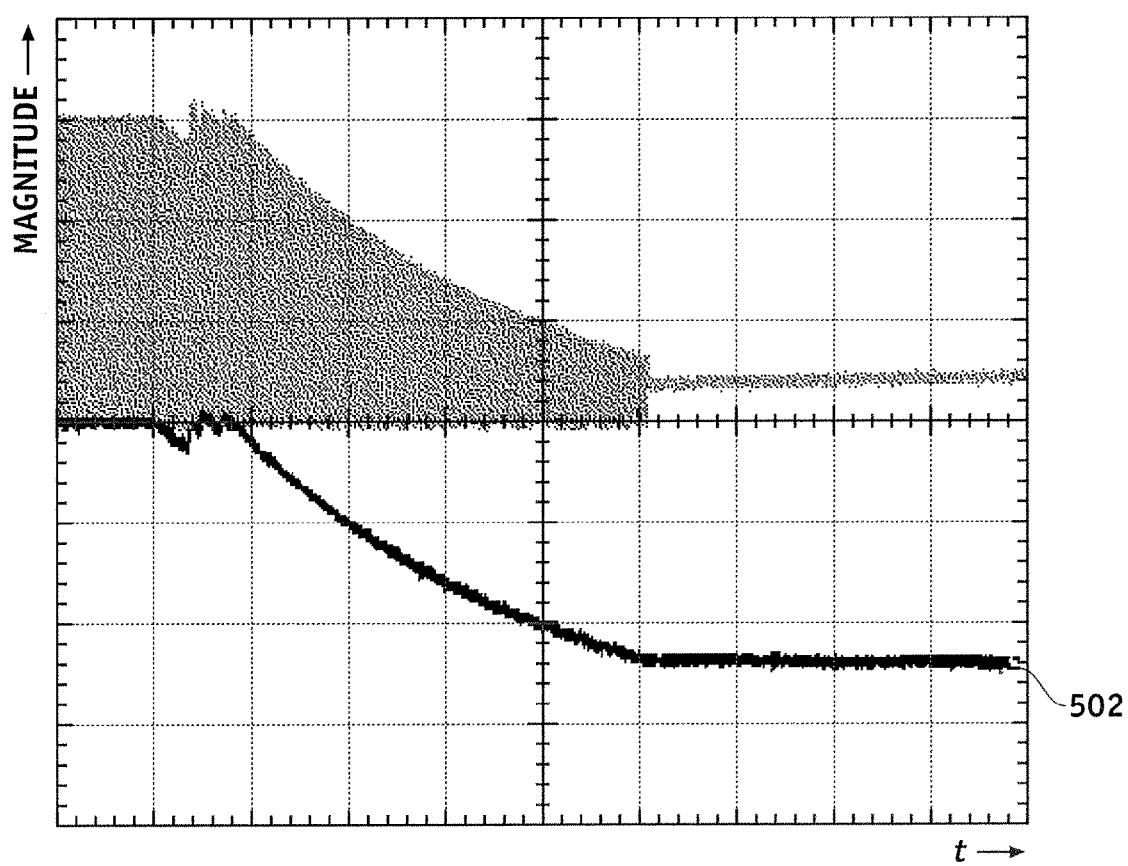
FIG. 5 illustrates a graph of the discharge of the DC bus by the discharge operational signal generator of the electric motor system of FIG. 1 in accordance with the embodiment of the present invention.

Referring to FIG. 5, a graph 500 of the discharge of the DC bus 135 by the discharge operational signal generator 174 shows a discharge time 502 at low speed for a motor 110, such as an internal permanent magnet motor, in accordance with the present embodiment. The measured discharge time is about forty-five milliseconds (45 ms), a discharge time somewhat slower than most active discharge methods, such as discharging the DC bus 135 with dedicated circuitry, including a sizable resistor or other resistive element. However, while providing a discharge scheme that may be slower than typical active discharge methods, implementation of a discharge methodology in accordance with the present embodiment advantageously provides a means for discharging the DC bus 135 without requiring a separate discharge circuit, without requiring a separate resistive element, and without requiring knowledge of the resolver 160 position or speed information or the phase currents of the motor 110.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for discharging a direct current (DC) bus providing power to a motor control circuit in an electric motor system, the method comprising the steps of:
   detecting a predetermined discharge signal;
   generating operational control signals for generating a ripple current in motor windings of an electric motor of the electric motor system to dissipate energy from the DC bus through a passive load in response to detecting the predetermined discharge signal, wherein the passive load comprises the motor windings of the electric motor; and
   providing the operational control signals to the motor control circuit for discharging the DC bus through the motor control circuit and the motor windings of the electric motor.

2. The method in accordance with claim 1 wherein the step of generating the operational control signals for generating the ripple current comprises the step of generating the operational control signals having a predetermined switching sequence and a predetermined duty cycle.

3. The method in accordance with claim 2 wherein the predetermined duty cycle comprises a duty cycle having a frequency greater than ten kilohertz (10 kHz).

4. The method in accordance with claim 2 wherein the predetermined duty cycle comprise a duty cycle having a frequency greater than ten kilohertz (10 kHz) and less than twelve kilohertz (12 kHz).

5. The method in accordance with claim 2 wherein the predetermined switching sequence comprises a series of predetermined signals for switching active switching vectors of the electric motor.

6. The method in accordance with claim 5 wherein the series of predetermined signals for switching the active switching vectors of the electric motor comprise signals that at any point in the series of the predetermined signals switch two or more of the active switching vectors in a predetermined manner such that at the point in the series of the predetermined signals the active switching vectors add up to zero.

7. The method in accordance with claim 5 wherein the active switching vectors comprise six active switching vectors, the six active switching vectors comprising three vector pairs of two active switching vectors each, the two active switching vectors of each of the three vector pairs adding up to zero, and wherein the series of predetermined signals for switching the active switching vectors comprise signals that at any point in the series of the predetermined signals switch the two active switching vectors of one of the three vector pairs in a predetermined manner to add up to zero.

8. The method in accordance with claim 1 wherein the step of generating the operational control signals comprises the step of generating the operational control signals for generating the ripple current in response to voltage vector pairs of the electric motor.

9. A processor for providing operational signals to a motor control circuit in an electric motor system, the motor control circuit receiving power from a direct current (DC) bus, the processor comprising:
   a first operational signal generator for receiving a torque command and generating first operational control signals in response thereto;
   a second operational signal generator for generating second operational control signals for generating a ripple current in motor windings of an electric motor of the electric motor system to dissipate energy from the DC bus through a passive load in response to detecting a predetermined discharge signal, the passive load comprising the motor windings of the electric motor; and an output handler coupled to the first and second operational signal generators, the output handler providing the first operational control signals to an output of the processor in response to not receiving the second operational control signals and providing the second operational control signals to the output of the processor in response to receiving the second operational control signals.

10. The processor in accordance with claim 9 wherein the second operational signal generator generates the second operational control signals having a predetermined switching sequence and a predetermined duty cycle.

11. The processor in accordance with claim 10 wherein the predetermined duty cycle comprises a duty cycle having a frequency greater than ten kilohertz (10 kHz).

12. The processor in accordance with claim 10 wherein the predetermined switching sequence comprises a series of predetermined signals for switching active switching vectors of the electric motor.

13. The processor in accordance with claim 9 wherein the second operational signal generator generates the second operational control signals for generating the ripple current in the motor windings of the electric motor in response to voltage vector pairs of the electric motor.

14. An electric motor system comprising:
an electric motor;
an inverter coupled to the electric motor and providing electric control therefor;
a direct current (DC) bus coupled to the inverter for providing power thereto; and
a processor coupled to the inverter for generating operational control signals and providing such operational control signals to the inverter, wherein the processor generates the operational control signals for generating a ripple current in motor windings of the electric motor to dissipate energy from the DC bus through a passive load in response to detecting a predetermined discharge signal, wherein the passive load comprises the motor windings of the electric motor.

15. The electric motor system in accordance with claim 14 wherein the processor generates first operational control signals and second operational controls signals, the first operational control signals generated in response to a received torque command and comprising phase currents for provision to the inverter for control of the electric motor and the second operational control signals generated in response to detecting the predetermined discharge signal and comprising operational control signals for generating the ripple current in the motor windings of the electric motor to dissipate energy from the DC bus through the passive load.

16. The electric motor system in accordance with claim 15 wherein the processor generates the second operational control signals having a predetermined switching sequence and a predetermined duty cycle.

17. The electric motor system in accordance with claim 16 wherein the predetermined duty cycle comprises a duty cycle having a frequency greater than ten kilohertz (10 kHz).

18. The electric motor system in accordance with claim 16 wherein the predetermined switching sequence comprises a series of predetermined signals for switching active switching vectors of the electric motor.

19. The electric motor system of claim 14 wherein the electric motor is an alternating current (AC) synchronous electric motor.

20. The electric motor system of claim 14 wherein the inverter comprises a plurality of Insulated Gate Bipolar Transistors (IGBTs) having gates thereof coupled to the processor for receiving the operational control signals therefrom, the plurality of IGBTs controlling operation of the electric motor.

* * * * *